Patented Dec. 1, 1931

1,834,148

UNITED STATES PATENT OFFICE

WILLIS A. GIBBONS, OF GREAT NECK, NEW YORK, ASSIGNOR TO THE NAUGATUCK CHEMICAL COMPANY, OF NAUGATUCK, CONNECTICUT, A CORPORATION OF CONNECTICUT

PROCESS FOR TREATING RUBBER LATEX AND PRODUCT

No Drawing.   Application filed October 5, 1927.   Serial No. 224,286.

In the preparation of rubber by dehydration methods in which substantially the entire solid content of the latex is recovered in dry form, it has been proposed to alter the properties of the resulting rubber by various treatments of the latex prior to the dehydration. The present invention is concerned with a method of altering the physical characteristics of rubber prepared by the evaporation of latex, and with the product, and is principally concerned with producing a rubber having the milling characteristics of the coagulated rubbers, but maintaining the strength and other desirable properties which are found in the evaporated rubbers.

Briefly described the invention consists in forming an acid rubber by incorporating with the latex an easily hydrolyzable salt of a fixed acid and a volatile base in quantity sufficient to give a distinct acid reaction to the water extract of the rubber obtained by evaporating the latex, and then drying the treated latex. The salt may be added as such or formed in the latex. The invention may be practiced with unpreserved fresh rubber latex or with latex containing ammonia as a preservative. The invention also includes the product.

In carrying out the invention, if it is to be applied to fresh rubber latex as it is obtained from the trees and the latex is to be preserved for a comparatively short time before evaporating, and if the salt of a volatile base and a fixed acid, which is to be used, is of sufficient alkalinity to preserve the latex for the required time, the salt itself need only be added in the required quantity. If, however, the salt to be used gives a reaction on the acid side of neutrality, it will be necessary to add a sufficient amount of a volatile base to bring the latex up to an alkalinity sufficient to preserve it until evaporated. For instance, if the fresh latex is to be preserved for a relatively short time, and tertiary ammonium phosphate is the salt to be added to the latex, this alone may suffice for preservation, but if the salt to be used is an acid one, such as primary ammonium phosphate, there is also added an amount of ammonia sufficient to impart the desired alkalinity to the latex. The amounts of the material or materials to be added will, of course, vary in accordance with the nature of the latex, the time during which it is to be preserved, and other conditions. The treated latex may then be manufactured into rubber by any suitable evaporation process, and preferably by that process known as spray drying.

The invention may also be applied to latex which has already been preserved with a small amount of ammonia in the usual manner, as by adding varying amounts of primary, secondary or tertiary ammonium phosphates, or combinations of these, or equivalent material, depending upon the alkalinity which it is desired to impart to the latex, this in turn being governed by the time during which it is desired to preserve the latex.

As an example of the application of the invention, there were added to 3546 lbs. of fresh latex, 89 lbs. of a 20% ammonia solution and 110 lbs. of a solution of the commercial salt consisting substantially of primary ammonium phosphate, this solution being equivalent to a 10% solution of ordinary phosphoric acid and equivalent to approximately 1% phosphoric acid on the weight of the rubber. This latex was then spray dried and it was found that when a sample of the dried rubber was boiled with water, the water extract gave a pH of 5. Any suitable evaporation method may be employed for converting the latex into rubber.

The rubber thus prepared may be described as an evaporated rubber the water extract of which gives a faintly acid reaction. This rubber when placed on a mixing mill shows about the same characteristics as ordinary pale crepe or smoked sheet. It breaks down or plasticizes with about the same ease and behaves generally through the manufacturing processes in a similar manner. However, the strength of the rubber is superior to that of either pale crepe or smoked sheet, and in these properties quite closely resemble spray dried rubber prepared from ammonia preserved latex.

Ammonium phosphate is representative of compounds which may be best described as easily hydrolyzable salts of fixed acids and volatile bases. Preferably the base is ammonium, for the reason that the spray drying operation volatilizes the base and leaves a fixed acid or an acid salt in the rubber. Other fixed acids whose ammonium salts may be used are oxalic, and citric. The amount of salt to be added is preferably sufficient so that the water extract of the finished rubber will have a reaction slightly on the acid side of neutrality, that is the pH will be 6 or less.

Having thus described my invention, what I claim and desire to protect by Letters Patent is:

1. Process for treating latex which comprises incorporating with the latex an easily hydrolyzable compound of a volatile base and a fixed acid selected from the group comprising ammonium phosphates, ammonium oxalate and ammonium citrate, in quantity sufficient to give the water extract of the dried latex a pH of 6 or less, and manufacturing rubber from the latex by evaporation methods.

2. Process for treating latex which comprises adding to the latex an ammonium salt of a fixed acid in quantity sufficient to give the water extract of the dried latex a pH of 6 or less, and drying the latex.

3. Process for treating latex which comprises adding to the latex an easily hydrolyzable compound of a fixed acid and a volatile base in quantity sufficient to give a rubber whose water extract has a pH less than 6, and evaporating the latex to form crude rubber.

4. The entire dried product of latex incorporated with ammonia and phosphoric acid, the water extract of said product having a pH of 6 or less.

5. A rubber derived from all-solids-content-latex and containing as a drying decomposition product the residue of a salt selected from the group comprising ammonium phosphates, ammonium oxalate and ammonium citrate.

Signed at New York, New York, this 4th day of October, 1927.

WILLIS A. GIBBONS.

CERTIFICATE OF CORRECTION.

Patent No. 1,834,148.  Granted December 1, 1931, to

WILLIS A. GIBBONS.

It is hereby certified that error appears in the printed specification of the above numbered patent requiring correction as follows: Page 2, line 45, claim 5, strike out the period and insert instead , the water extract of said rubber having a pH of 6 or less.; and that the said Letters Patent should be read with this correction therein that the same may conform to the record of the case in the Patent Office.

Signed and sealed this 9th day of February, A. D. 1932.

(Seal)

M. J. Moore,
Acting Commissioner of Patents.